(12) United States Patent
Pyron

(10) Patent No.: US 7,954,858 B2
(45) Date of Patent: Jun. 7, 2011

(54) CONDUIT BODY WITH LOW FRICTION INNER SURFACE LAYER

(75) Inventor: Roger Pyron, Arlington, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 12/005,535

(22) Filed: Dec. 27, 2007

(65) Prior Publication Data

US 2008/0179877 A1    Jul. 31, 2008

Related U.S. Application Data

(60) Provisional application No. 60/898,447, filed on Jan. 31, 2007.

(51) Int. Cl.
*F16L 55/00* (2006.01)

(52) U.S. Cl. .......... 285/55; 285/149.1; 285/125.1; 174/50; 254/134.3 R

(58) Field of Classification Search .......... 285/55, 285/149.1, 149, 125.1; 174/50; 254/134.3 R, 254/134.3 FT
See application file for complete search history.

(56) References Cited

U.S. PATENT DOCUMENTS

| | | | | |
|---|---|---|---|---|
| 1,964,123 A | * | 6/1934 | Kaiser | 285/55 |
| 3,344,811 A | * | 10/1967 | Hoffmann | 285/55 |
| 4,047,741 A | * | 9/1977 | Pertriaux | 285/55 |
| 4,099,425 A | | 7/1978 | Moore | |
| 4,132,665 A | * | 1/1979 | Nelson | 254/134.3 R |
| 4,461,498 A | * | 7/1984 | Kunsman | 285/55 |
| 4,475,629 A | * | 10/1984 | Jonnes | 184/15.1 |
| 4,522,432 A | * | 6/1985 | Press | 285/55 |
| 4,648,744 A | | 3/1987 | Knapp | |
| 4,688,762 A | * | 8/1987 | DeBeradinis | 254/134.3 FT |
| 4,801,118 A | | 1/1989 | Wium | |
| 4,826,725 A | | 5/1989 | Harlow | |
| 4,892,442 A | | 1/1990 | Shoffner | |
| 4,895,221 A | * | 1/1990 | Carlson | 184/15.1 |
| 4,951,923 A | * | 8/1990 | Couture | 254/134.3 R |
| 5,022,493 A | * | 6/1991 | Buckelew | 184/16 |
| 5,161,427 A | | 11/1992 | Fukuda et al. | |
| 5,238,328 A | | 8/1993 | Adams et al. | |
| 5,277,455 A | * | 1/1994 | Graves et al. | 285/55 |
| 5,621,189 A | | 4/1997 | Dodds | |
| 5,654,526 A | * | 8/1997 | Sharp | 174/84 R |
| 6,450,551 B1 | * | 9/2002 | Lee | 285/55 |
| 6,452,096 B1 | | 9/2002 | Childers | |
| 6,580,029 B1 | * | 6/2003 | Bing | 174/360 |
| 6,646,204 B2 | | 11/2003 | Chaon et al. | |
| 6,758,245 B2 | | 7/2004 | Troschitz et al. | |
| 6,838,615 B2 | | 1/2005 | Pyron | |
| 7,053,308 B2 | | 5/2006 | Prats | |
| 2005/0253124 A1 | | 11/2005 | Pyron | |
| 2007/0007498 A1 | * | 1/2007 | Pyron | 254/134.3 FT |

* cited by examiner

*Primary Examiner* — Aaron Dunwoody
(74) *Attorney, Agent, or Firm* — Hoffmann & Baron, LLP

(57) ABSTRACT

A conduit body assembly includes a conduit body having a layer of lubrication material thereon to aid in pulling wires therethrough. The conduit body includes an elongate side wall, an open upper end and a conduit body interior. At least one hub is in communication with said body interior for passage of wires therethrough. A layer of lubrication material having a low coefficient of friction is adhered to at least on portion of the surface of the body interior.

8 Claims, 2 Drawing Sheets

CONDUIT BODY WITH LOW FRICTION INNER SURFACE LAYER

CROSS-REFERENCE TO RELATED APPLICATION

This application claims priority to U.S. Provisional Patent Application No. 60/898,447, filed on Jan. 31, 2007, herein incorporated by reference.

FIELD OF THE INVENTION

The present invention relates generally to an angled junction such as a conduit body or an elbow containing electrical wires and more particularly to a conduit body with bent radius having an inner lubrication layer that reduces friction associated with wires being pulled through the conduit body.

BACKGROUND OF THE INVENTION

As is well known in the art, many building codes require electrical wiring to be enclosed in electrical conduits which may be connected to each other in a branch network through the use of junctions such as electrical conduit bodies or elbows. Such electrical conduit systems are required to safely provide electric power to homes, commercial buildings, and the like. These conduit systems often include long runs of rigid electrical conduits with frequent changes in direction, such as 90 degree turns, and interruptions with various couplings to accommodate bends or changes in direction. The conduits themselves serve to provide a protective housing for the wires therein and to route these wires throughout the building or other installation as required. Conduits or elbows are typically constructed of a rigid metal pipe.

Typical electrical conduit bodies are often installed in the conduit systems at various locations to provide accesses to the wires in the conduits, or to route the wires through a bulkhead, an electrical equipment enclosure, a junction box, or other electrical fixture. These are marketed, for example, by Thomas and Betts Corporation, of Memphis, Tenn., in conjunction with the trademark "THOMAS & BETTS".

These electrical conduit bodies have a generally oblong body provided with integral longitudinal walls and end walls and a side wall, such walls defining a chamber open on one side of the body. Conventional conduit bodies can have openings at one or more ends as well as through the upper and lower walls. For instance, a removable cover may be provided for closing the open side of the body. The body is also provided with spaced conduit connecting hubs each defining a passageway communicating with the chamber defined by the body. The spacious accessible wiring chamber provides for a convenient location to pull conductors and make splices as well as provide a weather resistant conduit system when used with covers and gaskets.

Typically, wires are inserted through an opening on the bottom or side of the conduit body and out through another opening located along another side or top of the conduit body. Most often, the inside surface of these conduits is metal, some conduits having a surface rougher than others. The friction caused by rubbing of the wires against the edges of the hub access port of the conduit body makes it difficult to pull the wire through the conduit housing, especially if there are many bends along the conduit length. While power pullers are used for this purpose, it is not unusual for the puller cords to break, leaving a partially pulled wire end that is very difficult to access within the conduit. In addition, the friction of the wire insulation rubbing against the edges of openings of the conduit body may damage the insulation on the wires.

Attempts to minimize such friction associated with the rubbing of wires against the openings of conduit bodies at the manufacturer's end have been less than satisfactory. For instance, some manufacturers have inserted roller pins and smooth clip shields to minimize the friction. Other attempts to minimize such friction have also been utilized, but they do not satisfactorily address the problem.

SUMMARY OF THE INVENTION

The present invention relates to a conduit body assembly including an elongate sidewall defining a body interior. At least one hub extends from the body in communication with the body interior for passage of wire therethrough. A lubrication material is applied within the body interior providing reduced frictional engagement with wire passing through the hub.

A method of manufacturing a conduit body assembly includes applying a layer of lubrication material to at least a portion of the conduit body interior.

DETAILED DESCRIPTION OF PREFERRED EMBODIMENTS

References herein to the term "lubrication" and variants thereof refer to a substance introduced between two moving surfaces to reduce the friction and wear between them. A lubricant provides a protective film layer which allows for two touching surfaces to be separated, thus lessening the friction between them.

Although the preferred embodiment of the invention is described in terms of a conduit body such as the type shown and described in commonly owned U.S. Pat. No. 6,838,615 issued Jan. 4, 2005, which is incorporated by reference for all purposes, a person skilled in the art will recognize that such inventive feature may be provided in an elbow or any other types of junctions or joints or variants thereof.

The present invention provides an angled junction such as a conduit body assembly for use in electrical conduit systems through which it is often difficult to pull wires without causing damage to the wire itself or the insulation surrounding the wire. The conduit body assembly of the present invention provides an access port or ports through which wires may be pulled. A lubrication layer comprising a slippery substance is provided in the internal chamber of the conduit body so that the wire slides over the smooth surface instead of being damaged or abraded by rough edges of the access port.

In a preferred aspect of the invention, the lubrication layer is a high surface gloss enamel finish, such as polytetrafluoroethylene (PTFE) commonly sold under the trademark TEFLON. The layer is permanently adhered to the inner surface of the conduit body or elbow such that the pulling action on the wires is further facilitated by the slick coating. This lubrication layer also minimizes the friction of the wires riding upon the rough edge of the access port. There are other benefits to adding a lubrication layer to a junction, such as keeping the moving parts apart, transferring heat, carrying away contaminants and debris, as well as protecting against wear and corrosion. Also, the lubrication layer provides a solution for future wire pulling in an existing conduit run.

Figure 1:
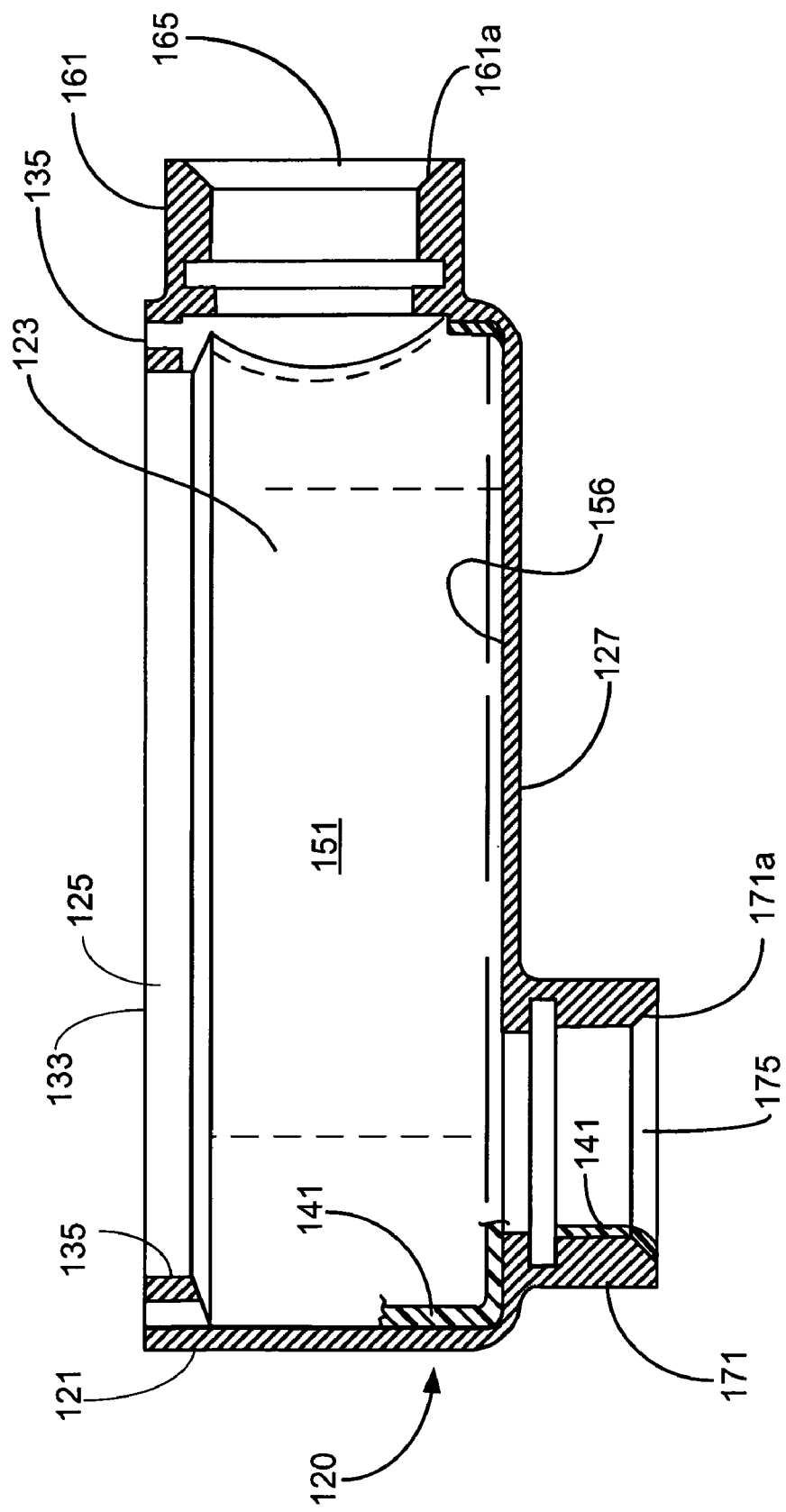
FIG. 1 is a cross-sectional view of the conduit body assembly of the present invention taken through the lines 1-1 of FIG. 2.
Figure 2:
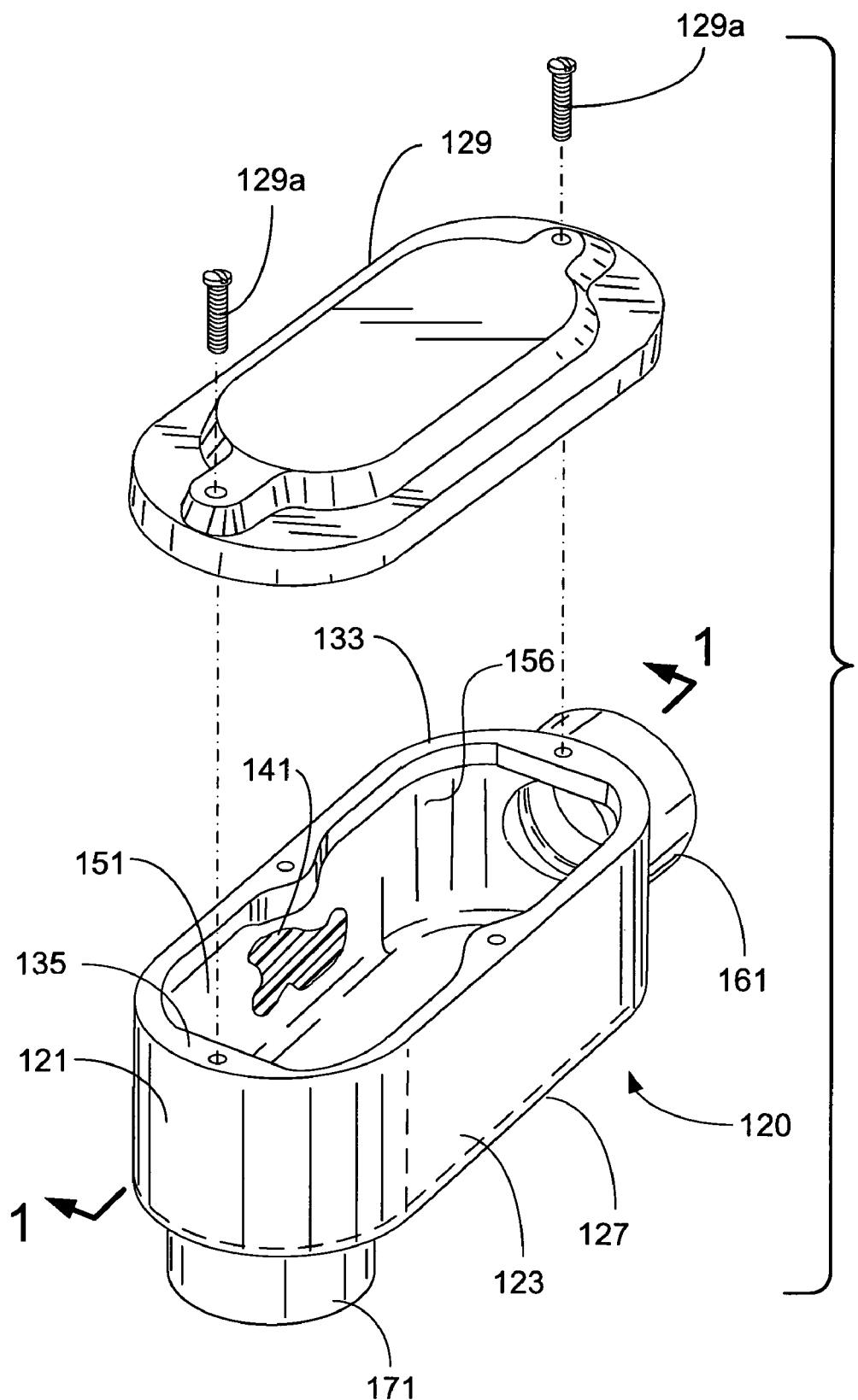
FIG. 2 is a perspective showing of the conduit body assembly of the present invention.

Referring to FIGS. 1 and 2, a cross sectional view of a conduit body assembly 120 with lubrication layer of the present invention is shown. The assembly 120 includes a conduit body 121 and cover 129. Conduit body 121 is a generally elongate tubular member which supports wires or cables (not shown) for passage therethrough.

Conduit body 121 includes an upwardly extending sidewall 123 having an open upper end 125 and a closed lower end 127. The sidewall 123 and lower wall 127 together define a conduit interior body chamber 151. The interior 151 may be enclosed by cover 129 as is conventionally known. Sidewall 123 defines at the open upper end 125 and a generally oval-shaped smooth planar rim 133. Rim 133 includes at opposite ends a pair of inwardly directed lips 135 which support the cover.

Conduit body 121 further includes a pair of tubular projections or hubs 161 and 171 extending outwardly from conduit body interior 151. Hubs 161 and 171 are in communication with conduit interior body chamber 151 and serve as points of attachment for conduits (not shown). Each hub 161 and 171 ends in a circular opening or access port, 165 and 175, respectively. Access ports 165 and 175 have an inner diameter substantially equal to an outer diameter of a conduit (not shown) so as to accommodate a conduit therein. The conduits may be attached to the conduit body 121 in any conventional manner, including but not limited to via an adhesive, a bonding agent or a mechanical device, such as a male/female threading.

Optionally, the conduit body 121 may be configured as a through feed, back. left, right side opening, dead end, t-style or any other configuration known in the art.

The present invention provides a lubrication layer 141 on at least a portion of the inner surface 156 of conduit body 121. While in a preferred embodiment the lubrication layer 141 may be uniformly applied to the entire interior surface 156 of the conduit body 121 including hubs 161 and 171, as an alternative aspect, the lubrication layer 141 may be applied to several discrete areas. Other configurations and locations of a lubrication layer 141 which effectively protect wires are contemplated. The lubrication layer 141 is provided so as to increase the lubricity of the inside of conduit body 121, making wire pulling therethrough easier.

The lubrication layer 141 can be used in the following manner. Wire (not shown) will enter the conduit body 121, for example, through access port 165 of hub 161. The wire will be pulled over lubrication layer 141 and out through open upper end 125. Any wire attachment or other required electrical work is then performed. A cover 129 or other appropriate piece may be placed over the upper end 125 upon completion of the work. The cover 129 may be secured to the body 121 by screws 129a of other fastening hardware.

Desirably, lubrication layer 141 is a smooth material applied evenly as shown in FIG. 1. Other configurations of lubrication layer 141 that facilitate the sliding of wires through a conduit body 121 with minimal friction are contemplated.

The lubrication layer 141 of the present invention allows for wires to be pulled directly through the conduit without exiting via open upper end 125 with minimal friction caused by the wires rubbing against the untreated inside edges of the hub 161, 171 as well as other surfaces of the conduit body 121. As wires are pulled through the conduit body 121, they tend to bend and rub against the inside edges of the hubs. Layer 141 may also be located on the inside edges 161a, 171a of hubs 161, 171 so that wires rub against the lubrication layer. Thus, layer 141 of the present invention minimizes the friction associated with pulling the wires through the conduit body 121 and facilitates the movement of the electrical wires through the conduit body 121. Additionally, the layer 141 of the present invention protects wires from damage that may be caused by the wires rubbing against the untreated inside surfaces of the body 121. Further, the layer 141 will remain within conduit body 121 in the event its lubricating features are needed in the future. This is because layer 141 adheres or bonds to all or a portion of the surface 156 of interior 151 such as via a curing or drying process. The color of such layer may be transparent, translucent or any unique color if such is desired.

Desirably, the layer 141 is of a highly lubricious nature. Desirable materials for the layer 141 include, but are not limited to, nylon, polyethylene terephthalate (PET), polytetrafluoroethylene (PTFE), and the like. Most desirably, the layer 141 is a self-lubricating material such as PTFE. In addition, although the application of paints with additives such as PTFE would be the most popular, other types of lubrication are envisioned by the invention. Interior slick coatings could come in a number of variations with numerous possible formulations and components.

For example, besides the PTFE mentioned above, non-liquid lubricants including grease, paste, powders (dry graphite, Molybdenum disulfide, Boron nitride, etc.), air cushion and others are possible. Also, typical liquid-based lubricants containing 90% base oil (most often petroleum fractions, called mineral oils) and less than 10% additives defining emulsions and suspensions are envisioned as well. Vegetable oils or synthetic liquids such as hydrogenated polyolefins, esters, silicone, fluorocarbons and many others are sometimes used as base oils. Additives deliver reduced friction and wear, increased viscosity, improved viscosity index, resistance to corrosion and oxidation, aging or contamination, etc.

The conduit body 121 and cover 129 may be formed of a metallic material, non-metallic material or a combination thereof. Useful metallic materials include aluminum, steel and the like. Useful non-metallic materials include polyvinyl chloride, nylons, high density polyethylene and combinations thereof.

The present invention also relates to a method of manufacturing a conduit body having a low coefficient of friction. Such method provides a device which facilitates wire pulling without manually using excessive amounts of lubricants to minimize friction of wires against the interior of the conduits. Thus, the prior methods, where the installer uses a wire pulling lubrication material to aid in pulling wires through the conduit are messy. These extraneous lubricants are in a gel state and are extremely messy to work with. There are problems with cleanup, residue, etc. Furthermore, for an already existing conduit body, the present method provides a permanent solution for future wire pulling the conduit run that reduces the friction associated with wires rubbing against the inside of the openings of a conduit body and alleviates the need for messy lubricants.

It will be apparent to those skilled in the art that the present invention has been described herein with reference to certain preferred or exemplary embodiments of conduit bodies. Accordingly, the particularly disclosed preferred embodiments are intended in an illustrative and not in a limiting sense. The preferred or exemplary embodiments described herein may be modified, changed, added to, or deviated from without departing from the intent, spirit and scope of the present invention. For instance, elbow joints are also envisioned by the present invention. Thus, it is intended that all such additions, modifications, amendments and/or deviations be included within the scope of the following claims.

What is claimed is:

1. A conduit body assembly, comprising:
a conduit body; and
a cover;
said conduit body being an elongate tubular member including an elongate perimetrical side wall having an open upper end and a closed lower end, the side wall and lower end defining a conduit body interior;
said upper end of said side wall defining a generally oval planar rim having a pair of oppositely directional lips, said rim and said lips forming a seat for accommodating said cover and enclosing said conduit body interior;
said conduit body including a first tubular conduit attachment hub extending from said body and in communication with said body interior;
a second tubular conduit attachment hub extending from said body and in communication with said body interior;
said first and second hubs defining access ports for passage of wire through said hubs and said body interior; and
a layer of a lubrication material having a low coefficient of friction permanently adhered to an interior surface of said conduit body and to an interior surface of said tubular hubs, said layer of lubrication material remaining permanently adhered thereto during use for facilitating said passage of said wire therethrough.

2. A conduit body assembly according to claim 1, wherein said lubrication material is applied uniformly interior surface of said conduit body and said interior side of said hubs.

3. A conduit body assembly according to claim 1, wherein said lubrication material is adhered by curing.

4. A conduit body of claim 1 wherein said layer is polytetrafluoroethylene (PTFE).

5. A method of manufacturing a low-friction conduit body assembly comprising the steps of:
providing an elongate tubular conduit body having a perimetrical side wall, an open upper end, a closed lower wall and a conduit body interior and a pair of tubular conduit attachment hubs forming access ports for passage of wire, said upper end of said side wall defining a generally oval planar rim having a pair of oppositely directional lips, said rim and said lips forming a seat for accommodating said cover and enclosing said conduit body interior;
providing a cover for seating over said open upper end of said conduit body; and
permanently adhering a layer of lubrication material having a low coefficient of friction to an interior surface of said body and to said hubs which remains permanently adhered thereto during use so as to facilitate said passage of said wire therethrough.

6. A method of claim 5, wherein said adhering step includes adhering said layer uniformly to said surface of said body interior.

7. A method of claim 5, wherein said adhering step includes adhering said layer to selected locations of said body interior.

8. A method of claim 5, wherein said adhering step includes adhering said layer to said hubs.

* * * * *